United States Patent [19]

Pascault et al.

[11] Patent Number: 5,554,703
[45] Date of Patent: Sep. 10, 1996

[54] NITROGENOUS MULTIACRYLIC MONOMERS, THEIR PREPARATION AND THEIR APPLICATION TO THE OBTENTION OF NEW POLYMERS

[75] Inventors: Jean-Pierre Pascault, Villeurbanne; Florence Rolly, Saint-Priest; Mohamed Taha, Clapiers; Christelle Titier, Saint-Beauzire, all of France

[73] Assignee: Cray Valley S.A., Puteaux, France

[21] Appl. No.: 108,566

[22] PCT Filed: Dec. 23, 1992

[86] PCT No.: PCT/FR92/01229

§ 371 Date: Jan. 18, 1994

§ 102(e) Date: Jan. 18, 1994

[87] PCT Pub. No.: WO93/13050

PCT Pub. Date: Jul. 8, 1993

[30] Foreign Application Priority Data

Dec. 24, 1991 [FR] France ............... 91 16125

[51] Int. Cl.$^6$ .................. C08F 283/00; C08F 283/10
[52] U.S. Cl. .............. 525/530; 525/540; 525/912; 525/922; 528/93; 528/103
[58] Field of Search .............. 528/103, 93; 525/530, 525/922, 540, 912

[56] References Cited

U.S. PATENT DOCUMENTS

| | | | |
|---|---|---|---|
| 4,704,437 | 11/1987 | Kiessling | 525/523 |
| 5,153,277 | 10/1992 | Awaji et al. | 525/530 |
| 5,235,008 | 8/1993 | Hefner et al. | 525/922 |

FOREIGN PATENT DOCUMENTS

| | | |
|---|---|---|
| 0044816 | 1/1982 | European Pat. Off. . |
| 2141897 | 1/1973 | France . |
| WO86/06716 | 11/1986 | WIPO . |

OTHER PUBLICATIONS

Encyclopedia of Science and Technology, vol. 6, 1986 pp. 348–352.

Primary Examiner—John C. Bleutge
Assistant Examiner—Randy Gulakowski
Attorney, Agent, or Firm—Millen, White, Zelano, & Branigan, P.C.

[57] ABSTRACT

Nitrogenous multiacrylic monomers having the formula (I) are produced by reacting at least one diamine having the formula $H_2N$—R—$NH_2$ with at least one polyepoxide resin and at least one (meth)acrylic epoxide. Application in the production of polymers for use in the preparation of varnishes, adhesives, films and composite materials.

10 Claims, No Drawings

NITROGENOUS MULTIACRYLIC MONOMERS, THEIR PREPARATION AND THEIR APPLICATION TO THE OBTENTION OF NEW POLYMERS

BACKGROUND OF THE INVENTION

The present invention relates to new nitrogeneous multiacrylic monomers, a process for their preparation and their application to the synthesis of new polymers.

Through the patent publication WO 86/06716 are already known monomers having the formula:

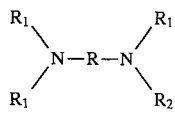
(A)

wherein $R_1$ is an acrylic or methacrylic group corresponding to the formula

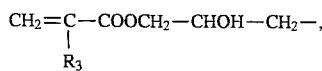

$R_3$ being selected from a hydrogen atom and a methyl group, $R_2$ is a hydrogen atom, a saturated aliphatic group comprising up to 10 carbon atoms or a group identical to $R_1$; and R is a bivalent group comprising at least one substituted or non-substituted aliphatic or aromatic ring.

These monomers lead, by radical polymerisation or copolymerisation, to polymers having thermal properties significantly better than those obtained from conventional acrylic monomers. However the applicant discovered that these polymers have the disadvantage of an important brittleness probably due to their too high crosslinking density. On the other hand, the synthesis of the monomers (A) involves a glycidyl acrylate or methacrylate whose reactivity with a diamine having the formula $H_2N$—R—$NH_2$ is insufficient under the conditions described in this document.

SUMMARY OF THE INVENTION

An objective of the present invention therefore consists in designing polymers which, while keeping the good thermal properties of the polymers described in the patent publication WO 86/06716, further show good mechanical properties, in particular the absence of brittleness, and which may be obtained from epoxides having a high reactivity towards diamines having the formula $H_2N$—R—$NH_2$.

Surprisingly this objective has been achieved by providing new nitrogenous multiacrylic monomers which constitute a first object of the present invention. This family of new monomers may be represented by the formula (I) hereinafter:

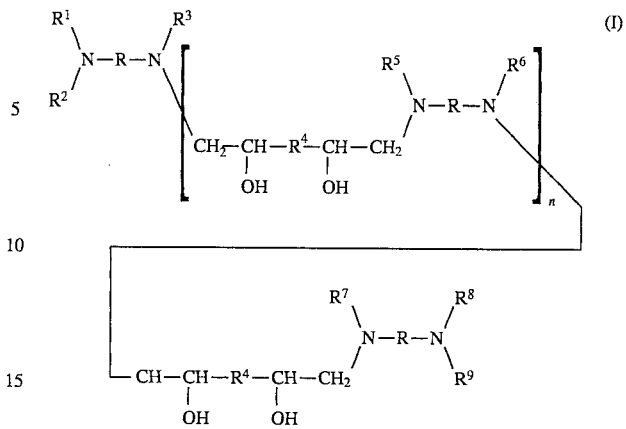

wherein:

n is an integer at least equal to 0, $R_1$, $R_2$, $R_3$, $R_5$, $R_6$, $R_7$, $R_8$ and $R_9$ are selected, independently from each other, from a hydrogen atom and acrylic or methacrylic groups having the formula

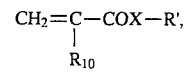

$R_{10}$ being selected from a hydrogen atom and a methyl group, X being selected from the sulfur and oxygen atoms and R' being a hydrocarbon group of 2 to 20 carbon atoms comprising a hydroxyl group within the backbone or at the end of the chain, selected from linear or branched alkyl groups, monocyclic or polycyclic cycloalkyl or heterocycloalkyl groups and alkylaryl groups, $R_4$ is a group having the formula —$CH_2$—O—$R_{11}$—O—$CH_2$— wherein $R_{11}$ is a bivalent group selected from alkylene groups having from 2 to 12 carbon atoms and those comprising at least a substituted or non-substituted aliphatic or aromatic ring, and R is a bivalent group comprising at least one substituted or non-substituted aliphatic or aromatic ring, with the proviso that:

when n is 0, at least 2 of the groups $R_1$, $R_2$, $R_3$, $R_7$, $R_8$ and $R_9$ are acrylic or methacrylic groups, and when n is higher than 0, at least 2 of the groups $R_1$, $R_2$, $R_3$, $R_5$, $R_6$, $R_7$ $R_8$ and $R_9$ are acrylic or methacrylic groups.

Group R and group $R_{11}$, when the latter is not an alkylene group, may contain two joined aliphatic or aromatic rings and may be in the form of $R_{12}$—$R_{13}$—$R_{12}$ where $R_{12}$ represents a cyclic or aromatic group preferably comprising from 5 to 10 carbon atoms substituted or unsubstituted by aliphatic groups or by heteroatoms, such as for example:

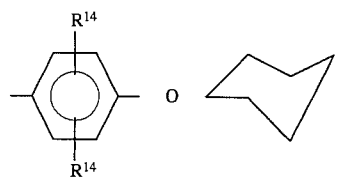

where $R_{14}$ represents a hydrogen or halogen atom or a methyl, ethyl or isopropyl group, and where $R_{13}$ represents a group which may be either a single atom (such as oxygen) or a group of atoms comprising carbon, hydrogen, oxygen and/or sulfur atoms, capable of linking the $R_{12}$ cycles by means of alkylene groups such as methylene or ethylene, or by means of ether or sulfone linkages.

Group R and group $R_{11}$, when the latter is not an alkylene group, may contain a single substituted or unsubstituted aliphatic or aromatic ring, such as for example:

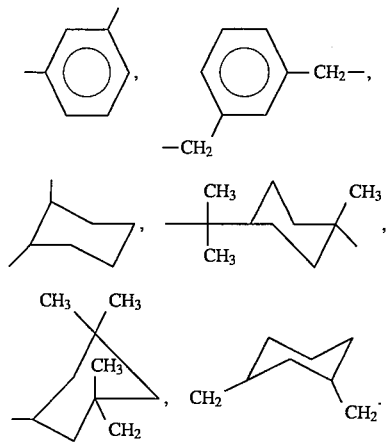

A second object of the present invention consists of a process for preparing monomers of the formula (I), comprising the reaction of at least a diamine having the formula $H_2N$—R—$NH_2$ (wherein R is as hereinabove defined) with at least a polyepoxidic resin and with at least a (meth)acrylic epoxide having the formula $$CH_2=\underset{R_{10}}{C}-COX-R''$$

wherein $R_{10}$ and X are as hereinabove defined and R'' is a hydrocarbon group of 2 to 20 carbon atoms comprising an oxirane group within the backbone or at the end of the chain, selected from linear or branched alkyl groups, monocyclic or polycyclic cycloalkyl or heterocycloalkyl groups and alkylaryl groups.

Among examples of diamines which may be used in the process of the invention may be namely cited diaminodiphenylmethane, 3,3', 5,5'-tetramethyl-4,4'-diaminodiphenylmethane, 4,4' diaminodiphenylether, 4,4' diaminodiphenyl sulfone, 4,4' diaminocyclohexylmethane, propylisophorone diamine, diaminoparamenthane, 1,2 diaminocyclohexane and 1,3-cyclohexane-bis-methylamine.

By polyepoxidic resin according to the present invention, it is meant a molecule having at least two epoxide functional groups. These resins are more particularly diepoxide resins such as, for example, bisphenol A diglycidyl ether, butadiene diepoxide, 3,4-epoxycyclohexylmethyl-3,4-epoxycyclohexanecarboxylate, vinylcyclohexene dioxide, 4,4'-di(1,2-epoxyethyl) diphenylether, 4,4'-(1,2-epoxyethyl) biphenyl, 2,2'-bis(3,4-epoxycyclohexyl) propane, resorcinol diglycidyl ether, phloroglucino diglycidyl ether, bis(2,3-epoxycyclopentyl) ether, 2-(3,4-epoxy)cyclohexane-5,5-spiro(3,4-epoxy)-cyclohexane-m-dioxane, bis-(3,4-epoxy-6-methylcyclohexyl) adipate, N,N-m(phenylene bis-4,5-epoxy-1,2-cyclohexanedicarboxamide), an epoxy compound containing a hydantoin ring, and so on. Such resins may generally be represented by the formula:

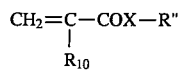 (II)

wherein $R_4$ has the same meaning as in formula (I).

For carrying out the process of the invention, one may also use triepoxidic or tetraepoxidic resins such as, for example, p-aminophenol triglycidylether, polyarylglycidyl ethers, 1,3,5-tri(1,2-epoxy) benzene, 2,2',4,4'tetraglycidoxybenzophenone, tetraglycidoxytetraphenylethane, the polyglycidylether of a novolac-type phenol-formaldehyde resin, glycerol triglycidylether, trimethylolpropane triglycidylether and tetraglycidyl-4,4'-diaminodiphenylmethane.

Among examples of (meth)acrylic epoxides which may be used in the process of the invention may namely be cited glycidyl acrylate and methacrylate, as well as those of (norbornyloxy-2)-2 ethyl, (dimethanodecahydronaphtyloxy-2)-2 ethyl, 4,5-epoxypentyl, 5,6-epoxyhexyl, 6,7-epoxyheptyl, 7,8-epoxyoctyl, 8,9-epoxynonyl, 9,10-epoxydecyl, 11,12-epoxydodecyl, 2,3-epoxybutyl, 2,3-epoxypropyl, octahydro-2,5-methano-2H-undeno(1,2-b)oxyrenyl and hydroxy-5(6)(epoxy-2,1'-ethyl)-2 bicyclo(2.2.1) heptane.

The reaction of the process of the invention may be effected either in a single step by simultaneously mixing the diamine, the polyepoxydic resin and the (meth)acrylic epoxide. It may also be effected in two steps by first reacting the diamine and the polyepoxydic resin, and then mixing the product of this first reaction with the (meth)acrylic epoxide. Whatever the selected embodiment, it is preferable that the respective proportions of the polyepoxidic resin and of the (meth)acrylic epoxide be selected in order to remain below the gel point until the end of the reaction. More precisely, according to the relationship of MACOSKO and MILLER (Macromolecules, 1976, vol.9, pages 199–211) between the conversion ratio at the gel point and the functionality of the reactive species in the case of a polycondensation reaction, it is preferable that the molar concentration of the polyepoxydic resin $C_1$ and the molar concentration of the (meth)acrylic epoxide C be linked by the inequation:

$$C_1\left(i^2-\frac{4i}{3}\right)<\frac{C}{3}$$

i being the functionality of the polyepoxidic resin, i.e. the number of epoxy proups per molecule.

If several diamines are simultaneously used in the process of the invention, a statistical mixture of monomers of the formula (I) comprising various divalent groups R will be obtained.

The process according to the invention may be carried out either in bulk, i.e. in the absence of any solvent, at a temperature between about 20° C. and 100° C. and more particularly between 25° C. and 50° C., or in solution in an inert solvent at a temperature not exceeding the boiling temperature of the said solvent. As a n inert solvent may be selected an aromatic hydrocarbon such as toluene or xylenes, or a ketone such as acetone or methykethylketone or an ether such as tetrahydrofurane.

The process of the invention may also be carried out in the presence of an organic ethynically unsaturated compound such as:

an unsaturated nitrile such as acrylonitrile or methacrylonitrile, a N-substituted maleimide such as N-ethylmaleimide, N-isopropylmaleimide, N-n-butylmaleimide, N-isobutylmaleimide, N-tertiobutylmaleimide, N-n-octylmaleimide, N-cyclohexylmaleimide, N-benzylmaleimide and N-phenylmaleimide, acrylic and methacrylic oxazolidones selected from those of formulae:

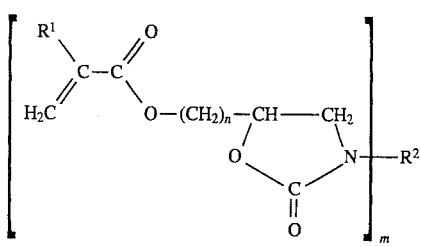

and:

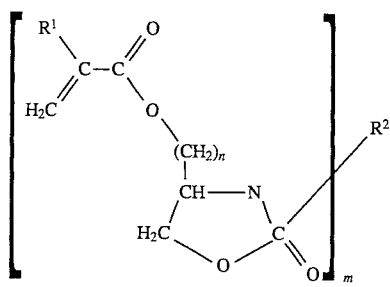

wherein

R₁ is selected from a hydrogen atom and a methyl group, n is an integer from 1 to 12, m is an integer from 1 to 3, and R₂ is a linear or branched alkyl or cycloalkyl or aromatic hydrocarbon radical having from 5 to 12 carbon atoms, a vinylaromatic hydrocarbon such as styrene, vinyltoluene, alphamethylstyrene, chlorostyrenes, betamethylstyrene, p-tertiobutylstyrene or vinylnaphtalene, an alkyl ester of acrylic or methacrylic acid, a monocyclic (such as those of cyclohexyl or benzyl) or bicyclic (such as those of isobornyl) acrylate or methacrylate, diallyl phtalate, or a polyol acrylate or methacrylate such as the diacrylates and dimethacrylates of ethylene glycol, propylene glycol, 1,3-butanediol, 1,4-butanediol, 1,6-hexanediol, neopentylglycol, 1,4-cyclohexanediol, 1,4-cyclohexanedimethanol, 2,2,4-trimethyl-1,3-pentanediol, 2-ethyl-2-ethyl-1,3propanediol, 2,2-diethyl-1,3 propanediol, diethylene glycol, dipropylene glycol, triethylene glycol, tripropylene glycol, tetraethylene glycol, tetrapropylene glycol, trimethylolethane, trimethylolpropane, glycerol and pentaerythritol, the triacrylates and trimethacrylates of trimethylolethane, trimethylolpropane, glycerol and pentaerythritol, the tetraacrylates and tetramethacrylates of pentaerythritol, the di(meth)acrylates up to hexa(meth)acrylates of dipentaerythritol, poly(meth)acrylates of mono- or polyethoxylated or mono- or polypropoxylated polyols such as triacrylate and trimethacrylate of triethoxylated trimethylolpropane, tripropoxylated trimethylolpropane and tripropoxylated glycerol, triacrylate, trimethacrylate, tetraacrylate and tetramethacrylate of tetraethoxylated pentaerythritol and caprolactone methacrylate.

Most systems of reactives and products obtained are in fact soluble in such organic ethylenically unsaturated compounds.

The process of the invention may be carried out without catalyst or in the presence of an effective amount of at least a catalyst preferably selected from Lewis acids. Among examples of suitable catalysts may be cited tertiary amines, boron trifluoride etherate and paratoluenesulfonic acid methyl ester.

At last, a third object of the present invention consists in the use of the new nitrogeneous multiacrylic compounds described hereinabove to the constitution of new polymers and copolymers.

More precisely the present invention relates to polymers and copolymers comprising at least one unit derived from at least a nitrogeneous multiacrylic compound of formula (I). Such (co)polymers may further comprise at least one unit derived from at least a comonomer copolymerizable with the said nitrogeneous multiacrylic compound of formula (I), such as for example an organic ethylenically unsaturated compound described hereinbefore as a solvent for the synthesis of the compound of formula (I).

Such polymers and copolymers are obtained by (co)polymerizing at least a nitrogeneous multiacrylic compound according to the invention and, if needed, at least a copolymerizable comonomer, such as hereinbefore defined, in the presence of at least a free-radical initiator such as a peroxide, a hydroperoxide or a diazo compound. (Co)polymerization is generally effected at a temperature between about 50° C. and 120° C. and by using one of the monomers as a solvent.

Compositions of a nitrogeneous multiacrylic compound and a comonomer may also be crosslinked by means of X rays or ultraviolet light. In the latter case, there will be used photoinitiators such as benzoin or its derivatives, or photosensitizers such as benzophenone, triethylaminoethanol or benzophenone triethylamine. Polymerizations are effected at room temperature. Exposure times vary from a few seconds to a few minutes.

Another method consists in polymerizing these compositions by means of an accelerated electron beam having an energy between about 0.2 and 10 mega eV. The main advantage of this process lies in the very high polymerization rates of the formulations subjected thereto. Irradiation is effected at room temperature and under room atmosphere. In some cases, use of an inert atmosphere will improve the surface aspect of the polymers obtained. In some cases, a thermal post-treatment may be applied at temperatures ranging from 100° C. to 200° C. during a few minutes to a few tens of minutes according to the technique used (oven, infrared, micro-wave, . . . ). Another advantage of the use of accelerated electrons lies in their good penetration in the material to be crosslinked, which makes it a better solution than ultraviolet light for the polymerization of composite material articles. The low energetical cost of such kind of process will be a further advantage.

Such polymers and copolymers combine a great ability to crosslinking, leading to highly crosslinked, infusible and insoluble tridimensional polymers, and good themal performances. Therefore these products may be advantageously used, amongst other uses, in some formulations intended for the manufacture of varnishes, adhesives, coatings, composite materials and others.

The following examples are provided in order to illustrate and not to limit the present invention.

EXAMPLE 1

At 40° C. is effected the condensation in bulk of a mixture comprising 1 mole bisphenol A diglycidyl ether, 6 moles glycidyl methacrylate and 2 moles 3,3' dimethyl-4,4'-diamino dicyclohexylmethane. After 15 hours reaction, the degree of conversion of the epoxy groups, determined by size exclusion chromatography, is 88%. The chromatogram interpretation and the molecular weights distribution show the obtention of a mixture of the following products:

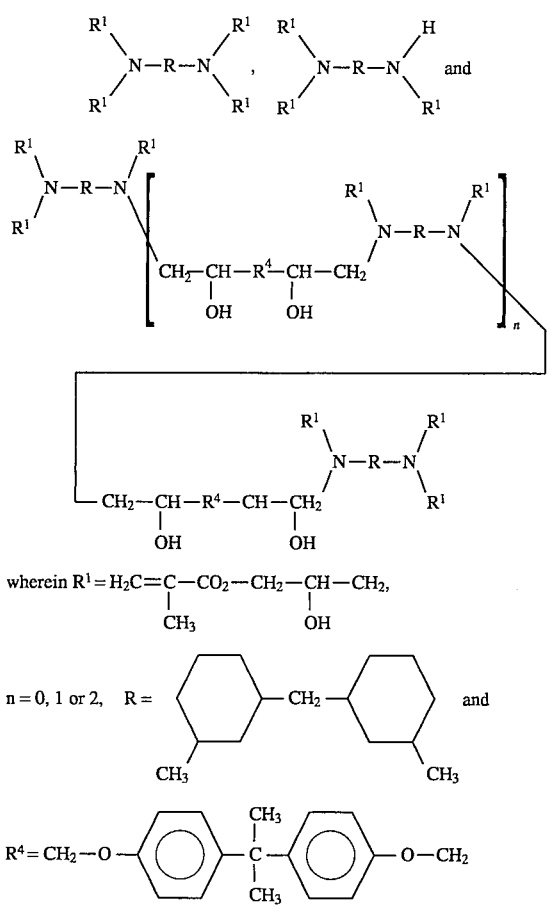

wherein $R^1 = H_2C=C-CO_2-CH_2-CH-CH_2$, with $CH_3$ and $OH$ substituents $n = 0, 1$ or $2$, $R =$ (dicyclohexylmethane with methyl groups) and $R^4 = CH_2-O-$ (bisphenol A group) $-O-CH_2$

EXAMPLE 2

The condensation of a mixture identical to that of example 1 is effected in solution at 40% by weight in styrene and at the temperature of 40° C. during 30 hours. Thereafter is added 1.5 part by weight of tertiobutyl perbenzoate for 100 parts of the mixture of example 1 and of styrene, and copolymerization is allowed to continue for 1 hour at 120° C. The very exothermic reaction is studied by differential microcalorimetry and shows an exothermic peak at 126° C. The network obtained is then studied by dynamic mechanical analysis and shows a glass transition temperature of 189° C. Mechanical tests show the following properties:

strength at break: 42 MPa elongation at break: 2%

EXAMPLE 3 (comparative)

There is effected the condensation in bulk and then the radical polymerization of a mixture comprising 4 moles glycidyl methacrylate and 1 mole 3,3'-dimethyl-4,4'-diaminodicyclohexylmethane in the presence of 1.5% by weight of tertiobutyl perbenzoate, according to the following temperature program: 3 hours at 50° C., then 3 hours at 120° C. and 3 hours at 180° C. in oven. A dynamic mechanical analysis twisting test at 1 Hz, from 25° C. to 250° C. at 2° C./min (distortion set: 0.1%) shows that a very brittle network is obtained: samples break during the test before reaching the glass transition temperature.

EXAMPLE 4

There is effected the condensation in bulk and then the radical polymerization of a mixture comprising 1 mole bisphenol A diglycidyl ether, 6 moles glycidyl methacrylate and 1 mole 3,3'-dimethyl-4,4' diaminodicyclohexylmethane in the presence of 1.5% by weight tertiobutyl perbenzoate according to the following temperature program: 3 hours at 50° C., then 3 hours at 120° C. and 3 hours at 180° C. in oven. The twisting dynamic mechanical analysis, similar to that of example 3, shows that a non-brittle homogeneous network is obtained. The sample does not break and a glass transition temperature of 175° C. is obtained.

EXAMPLE 5 (comparative)

Condensation at 40° C. of a mixture comprising 4 moles glycidyl methacrylate and 1 mole 3,3'-dimethyl-4,4' diaminodicyclohexylmethane is effected in solution at 40% by weight in styrene. After 67 hours of reaction, the conversion rate of the epoxy groups, determined by size exclusion chromatography, is 89%. The product obtained is then polymerized during one hour at 120° C. in the presence of 1.5 part by weight of tertiobutyl perbenzoate for 100 parts of the overall mixture. Study of the reaction by differential microcalorimetry shows an exothermic peak at 122° C. The network obtained has a glass transition temperature of 200° C.

We claim:

1. A process for preparing a nitrogenous multiacrylic compound of the formula

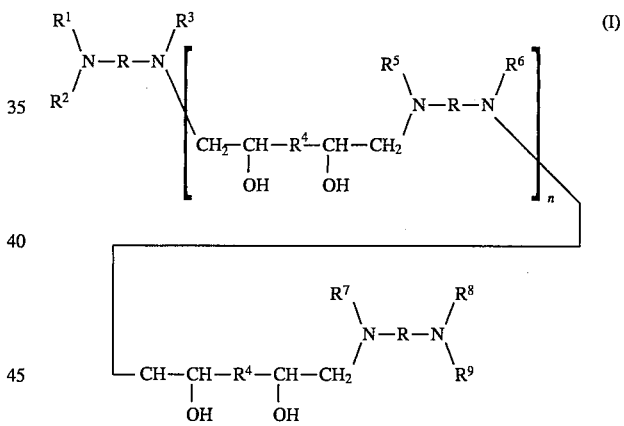

(I)

wherein n is an integer at least equal to 0, $R_1$, $R_2$, $R_3$, $R_5$, $R_6$, $R_7$, $R_8$ and $R_9$ are selected, independently from each other, from a hydrogen atom and acrylic or methacrylic groups having the formula

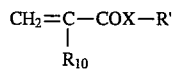

$R_{10}$ being selected from a hydrogen atom and a methyl group, X is selected from sulfur and oxygen atoms and R' being a hydrocarbon group of 2 to 20 carbons atoms comprising a hydroxyl group within the backbone or at the end of the chain, selected from linear or branched alkyl groups, monocyclic or polycyclic cycloalkyl or heterocycloalkyl groups and alkylaryl groups, $R_4$ is a group having the formula $-CH_2-O-R_{11}-O-CH_2-$ wherein $R_{11}$ is a bivalent group selected form alkylene groups having from 2 to 12 carbon atoms and those comprising at least a substituted or non-substituted aliphatic or aromatic ring, and R is a bivalent group comprising at least one substituted or non-substituted aliphatic or aromatic ring, with the proviso that when n is 0, at least 2 of the groups $R_1$, $R_2$, $R_3$, $R_7$, $R_8$ and $R_9$ are acrylic or methacrylic groups, and when n is greater than 0, at least 2 of the groups $R_1$, $R_2$, $R_3$, $R_5$, $R_6$, $R_7$, $R_8$ and $R_9$ are acrylic or methacrylic groups, said process comprising reacting (a) at least one diamine of the formula $H_2N$—R—$NH_2$ with ($C_1$) at least one polyepoxidic resin and with (C) at least one (meth)acrylic epoxide, the respective proportions of the polyepoxidic resin and the (meth)acrylic epoxide being selected in order to remain under the gel point until the end of the reaction, the molar concentration of the polyepoxidic resin, defined as $C_1$, and the molar concentration of the (meth)acrylic epoxide, defined as C, being linked by the equation:

$$C_1\left(i^2 - \frac{4i}{3}\right) < \frac{C}{3}$$

i being the functionality of the polyepoxidic resin, said reaction being conducted such that all the reactants are reacted simultaneously or (a) is reacted first with ($C_1$) and the resultant reaction product is reacted with (C).

2. A process according to claim 1, characterized it is carried out in bulk at a temperature between 20° C. and 100° C.

3. A process according to claim 1, characterized in that it is carried out in the presence of an inert solvent.

4. A process according to claim 1, characterized in that it is carried out in the presence of an effective amount of at least a Lewis acid catalyst.

5. A process according to claim 1, characterized in that the polyepoxidic resin is bisphenol A diglycidylether.

6. A process according to claim 5, wherein the reaction is conducted in bulk.

7. A process according to claim 1, wherein all the reactants are reacted simultaneously.

8. A process according to claim 1, wherein reactant (A) is reacted with ($C_1$) and the resulted reaction product is reacted with (C).

9. A process according to claim 1 conducted in the presence of an ethylenically unsaturated compound additional to the (meth)acrylic epoxide.

10. A process according to claim 1 conducted in the presence of an ethylenically unsaturated compound additional to the (meth)acrylic epoxide and a free-radical initiator, under such conditions that crosslinking occurs after polycondensation of the polyepoxidic resin, the diamine and the (meth)acrylic epoxide.

* * * * *